United States Patent [19]

Osborn

[11] 4,108,506
[45] Aug. 22, 1978

[54] BEARING LUBRICATING SYSTEM
[75] Inventor: Norbert Osborn, Irving, Tex.
[73] Assignee: WRR Industries, Inc., Dallas, Tex.
[21] Appl. No.: 735,267
[22] Filed: Oct. 26, 1976
[51] Int. Cl.² ............................................. F16C 1/24
[52] U.S. Cl. ................................................... 308/187
[58] Field of Search .................... 184/10, 38 B, 38 C, 184/38 R, 38 A, 37; 308/187, 78, 93, 96, 107, 114, 122, 170, 194

[56] References Cited
U.S. PATENT DOCUMENTS

| 458,056 | 8/1891 | James | 308/107 X |
| 481,118 | 8/1892 | O'Donnell | 308/187 X |
| 553,621 | 1/1896 | Kraus | 308/187 |
| 580,813 | 4/1897 | White | 308/93 |
| 2,217,801 | 10/1940 | Katcher | 308/187 |
| 2,403,397 | 7/1946 | Rankin | 308/187 X |
| 2,675,281 | 4/1954 | Heim | 308/194 |
| 2,885,247 | 5/1959 | Schlums | 308/187 |
| 3,645,592 | 2/1972 | Flandrena | 308/187 |
| 3,759,592 | 9/1973 | Carlson | 308/187 |

Primary Examiner—David H. Brown
Attorney, Agent, or Firm—Richards, Harris & Medlock

[57] ABSTRACT

The specification discloses a bearing lubricating system including a shaft having two inner raceways formed therearound and a concentric bore formed in the shaft. Passageways communicate between the bore and the inboard portion of the inner raceways. Balls are provided having radii slightly less than the arc radii of the raceways. The bearing structure is completed by an outer ring having two outer raceways formed therein. The outer raceways in the outer ring are separated more than the separation between the inner raceways in the shaft such that the balls contact the inner and outer raceways at an angle to a plane perpendicular to the axis of the bearings. As a result, the balls contact the inner raceways on the outboard portion of the raceways to prevent the balls from contacting the opening of the passageways into the inner raceways. The bore formed in the shaft is threaded along its entire length and is loaded with a suitable lubricant. A set screw is threadedly engaged in the threaded bore to form a reservoir of lubricant communicating with the passageways leading to the inner raceways. By selectively advancing the set screw in the threaded bore, lubricant is forced through the passageways and expelled onto the inner raceways where the lubricant is applied to and picked up by the balls as they move in the raceways.

8 Claims, 6 Drawing Figures

BEARING LUBRICATING SYSTEM

BACKGROUND OF THE INVENTION

1. Field of the Invention

This invention relates to a system for facilitating the lubrication of bearings and more specifically to a system for applying a lubricant to the raceway of a ball bearing for purposes of lubricating the bearing.

2. Prior Art

Lubrication is a determining factor controlling the life of a ball bearing system as well as the maximum speed at which ball bearings may be operated. Ball bearings experience high compressive stresses resulting in elastic deformation at the points of contact between the balls and raceways. The heat resulting from this elastic deformation as well as the heat resulting from surface friction is absorbed and dissipated by lubricating the bearing structures. Lubricant also prevents damage to bearing components by providing a viscous film at the point of contact between the balls and raceways.

Many systems have been utilized to maintain proper lubrication of bearing systems ranging from the most rudimentary steps of hand applications of lubricant to the balls and raceways to complex systems designed to control lubricating. An example of the complex methods of lubricating bearings disclosed in U.S. Pat. No. 3,637,270, to Johnson, issued Jan. 25, 1972, includes the use of inflatable, rubber innertube rings on both sides of the bearing to be greased. Grease is forced, under pressure, between the bearing and one of the inflatable rings. As the inflatable ring is inflated, the grease is forced through the bearing to the opposite side where the second inflatable ring is inflated to expel excess grease away from the bearing area. The complexity of such a system is readily appreciated as is the additional expense involved in the construction and maintenance of the numerous components involved.

Some applications permit the use of a prelubricated bearing. These bearings are of standard constuction but have lubrication sealed within the bearing structure. However, these bearings are subject to a limited lubrication life since lubricant is not normally replenished and are subject to failure when the seals fail to maintain the lubricant adjacent to bearing elements.

The existence of various systems for maintaining and applying lubrication to a bearing structure evidences the complete unacceptability of the system requiring the manual lubrication of bearings. This is particularly apparent in machinery having literally hundreds or thousands of moving parts which function on a bearing assembly. Thus, the need has arisen for a simple, inexpensive assembly for providing lubrication to bearing elements as needed.

SUMMARY OF THE INVENTION

The present invention provides a system for overcoming many of the disadvantages found in the prior art and specifically in providing a simple but accurate and effective structure for applying controlled amounts of lubricant to a ball bearing system particularly an integral shaft bearing system. In accordance with one embodiment of the invention, the bearing lubricating system includes a shaft having two inner raceways formed therearound. A concentric bore is formed in the shaft and passageways communicates between the bore and the inboard portion of the inner raceways. Balls are provided having radii slightly less than the arc radii of the raceways (typical ball bearing geometry). The bearing structure is completed by an outer ring having two outer raceways formed therein. The outer raceways in the outer ring are separated more than the separation between the inner raceways in the shaft such that the balls contact the inner and outer raceways at an angle to a plane perpendicular to the axis of the bearings. As a result, the balls contact the inner raceways on the outboard portion of the raceways to prevent the balls from contacting the opening of the passageways into the inner raceways. The bore formed in the shaft is threaded along its entire length. It will be apparent to one skilled in the art that the geometry could be reversed so that the balls contact the inboard portion of the inner raceway and the passageways connect to the outboard portion of inner raceways.

In operation of the lubricating system, the bore is loaded with a suitable lubricant and a set screw is threadedly engaged in the threaded bore to form a reservoir of lubricant communicating with the passageways leading to the inner raceways. By selectively advancing the set screw in the threaded bore, lubricant is forced through the passageways and expelled onto the inner raceways where the lubricant is applied to and picked up by the balls as they move in the raceways.

In accordance with another embodiment of the invention, the lubricating system includes a shaft having a single inner raceway formed therearound with a concentric bore formed in the shaft and a passageway communicating between the bore and one side of the inner raceway. Similarly to the first embodiment above described, balls are provided for tracking the inner raceway and an outer ring having an outer raceway formed therein is provided and is receivable around the ball bearing to retain the balls between the outer ring and the shaft. In this case the outer ring must be preloaded in one direction and the connecting passageway to the inner race placed in the appropriate position to avoid the balls contacting the opening in the race.

DESCRIPTION OF THE DRAWINGS

For a more complete understanding of the present invention, and for further details and advantages thereof, reference is now made to the following description taken in conjunction with the accompanying drawings in which.

DESCRIPTION OF THE PREFERRED EMBODIMENTS

Figure 1:
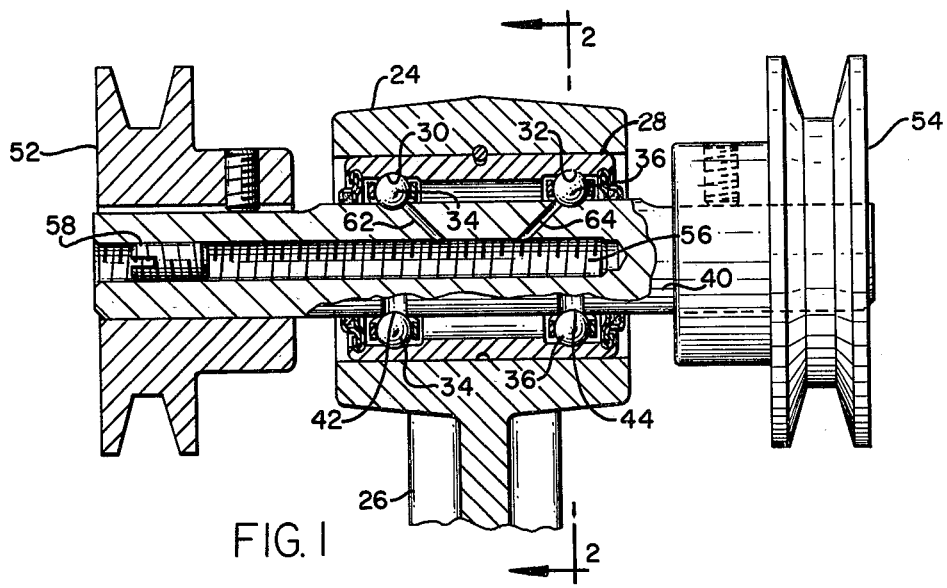
FIG. 1 illustrates a partial vertical section view of a bearing assembly embodying the present invention.
Figure 2:
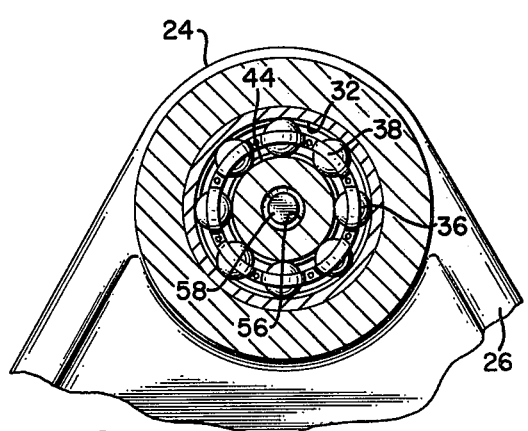
FIG. 2 is a section view taken along line 2—2 of FIG. 1.

FIGS. 1 and 2 illustrate a double row integral shaft bearing assembly 20 embodying the present invention. The bearing assembly 20 illustrated in FIG. 1 includes an outer support casing 24 supported from a leg 26. Casing 24 receives outer ring 28 in which outer raceways 30 and 32 are formed. Balls 34 and 36 track raceways 30 and 32, respectively. A shaft 40 has inner raceways 42 and 44 formed therearound and balls 34 and 36 track these raceways as illustrated in FIG. 1. A separator ring assembly 38 is attached around the bearings and maintains an equal spacing between the balls. The opposite ends of shaft 40 receive driving pulley 52 and driven pulley 54. It will be recognized that the application of bearing assembly 20 shown in FIG. 1 is for illustration purposes only, and that the bearing assembly of the present invention may be adapted to countless numbers of various applications other than that one illustrated in FIG. 1.

Shaft 40 is formed with a bore 56 formed therein along its longitudinal center line. Bore 56 is tapped and receives a threaded set screw 58 for selective advancement into and out of bore 56. Two passageways 62 and 64 formed in shaft 40 and communicate between bore 56 and the inboard side of raceways 42 and 44, respectively, formed in shaft 40.

Figure 3A:
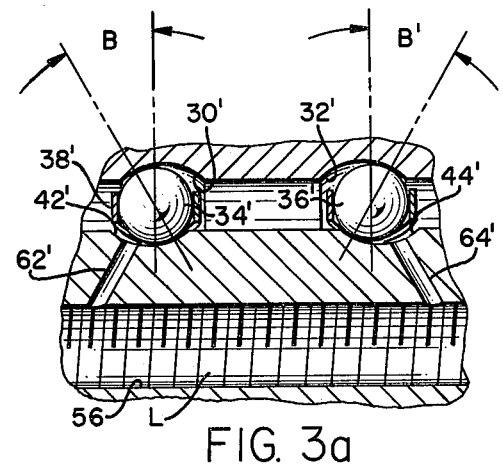
FIGS. 3 and 3a are an enlarged section view showing the relationship of the ball bearings to the inner and outer raceways.
Figure 3:
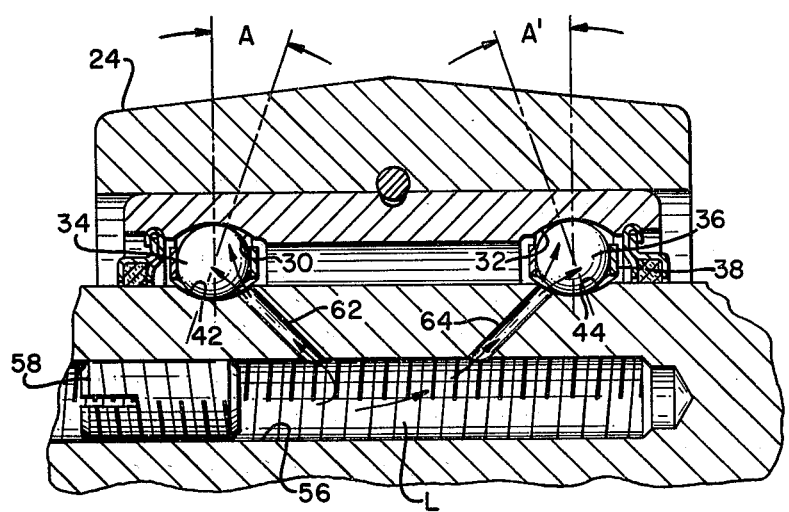

An extremely important aspect of the present invention is illustrated in FIG. 3, an enlarged section view illustrating the relationship of balls 34 and 36 to the inner and outer raceways. Bearing assembly 20 is designed such that the outer raceways are separated by a distance greater than the separation between the inner raceways thereby producing the contact angles A and A' between balls 34 and 36 and their respective tracks. The contact angles A and A' are opposed one to the other. As illustrated in FIG. 3, the race has an open face curvature, that is, the radii of the balls are slightly less than the radii of the raceway curvature, this being exaggerated in FIG. 3 for purposes of illustration only. The raceways and rings are ground so that the balls contact the inner and outer raceways at an angle to a plane perpendicular to the axis of the bearing. The contact angle between the row of balls 34 and the row of balls 36 are opposed such that balls 34 contact raceway 42 toward the outboard portion of the curvature of raceway 42 and the balls 36 contact raceway 44 toward the outboard portion of the curvature of raceway 44.

As illustrated in FIG. 3, passageways 62 and 64 communicate to raceways 42 and 44, respectively, along the inboard portion of the curvature of raceways 42 and 44. In this way, balls 34 and 36, while tracking raceways 42 and 44, do not contact the openings of passageways 62 and 64 into raceways 42 and 44. However, passageways 62 and 64 do open and communicate directly to raceways 42 and 44, respectively.

In operation of the bearing lubrication assembly illustrated in FIGS. 1 through 3, bore 56 is loaded with an appropriate lubricant L and set screw 58 threaded into bore 56 to close the bore. By selectively advancing screw 58, lubricant L is forced from bore 56 through passageways 62 and 64 to raceways 42 and 44, respectively. Thus, the lubricant is applied to and distributed by balls 34 and 36 as they move in raceways 42 and 44. In actual practice only a very minute quantity of lubricant is required to adequately protect the bearing. However, in the course of operation this lubricant is displaced to non-functional surfaces and must therefore be replenished with a very small quantity periodically for long life. The system is operated to periodically renew lubricant to the balls and raceways as desired by continuing to periodically advance set screw 58 in bore 56.

The passageways 62 and 64 communicate with bore 56 at approximately the same point along the longitudinal length of the bore. In this way, the amount of pressure exerted by a given advancement of set screw 58 forcing lubricant through passageways 62 and 64 is substantially identical thereby insuring an even application of the lubricant to both bearing rows. In the alternative embodiment illustrated in FIG. 3a, the contact angles B and B' between balls 34' and 36' and their respective raceways are reversed from that shown in the embodiment of FIG. 3 such that the balls contact the inboard side of inner raceways 42' and 44'. In this embodiment, passageways 62' and 64' communicate to the outboard side of inner raceways 42' and 44'. Because passageways 62' and 64' enter bore 56 at different points, they have different diameters (determined experimentally) to provide equal lubricant flow to their respective races.

Figure 4:
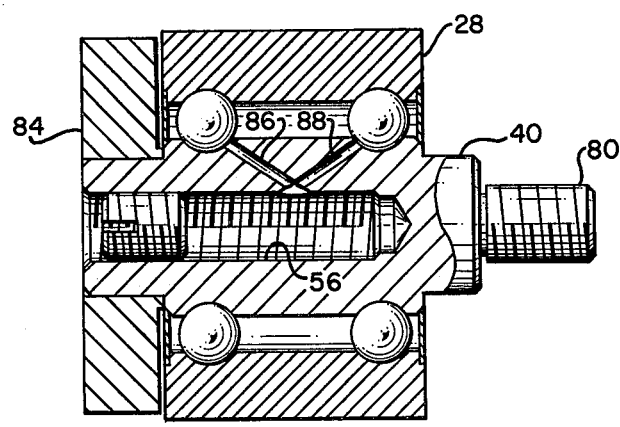
FIG. 4 is a vertical section view of a second type of bearing assembly embodying the present invention.

FIG. 4 illustrates a second type of bearing assembly embodying the present invention. In the embodiment illustrated in FIG. 4, the outer ring 28 also serves as an outer pulley to accept a suitable power transmission device. Shaft 40 is adapted on its end remote from the opening of bore 56 with a threaded nipple 80 for insertion into any desired receiving component. Thus, the bearing illustrated in FIG. 4 provides a ready pulley system for any location on any desired piece of machinery. A shield 84 provides added shielding protection from the movable outer ring 28. FIG. 4 also illustrates the formation of passageways 86 and 88 from a common point in bore 56 to the raceways thus assuring equal distribution of lubricant to the two rows of balls.

Figure 5:
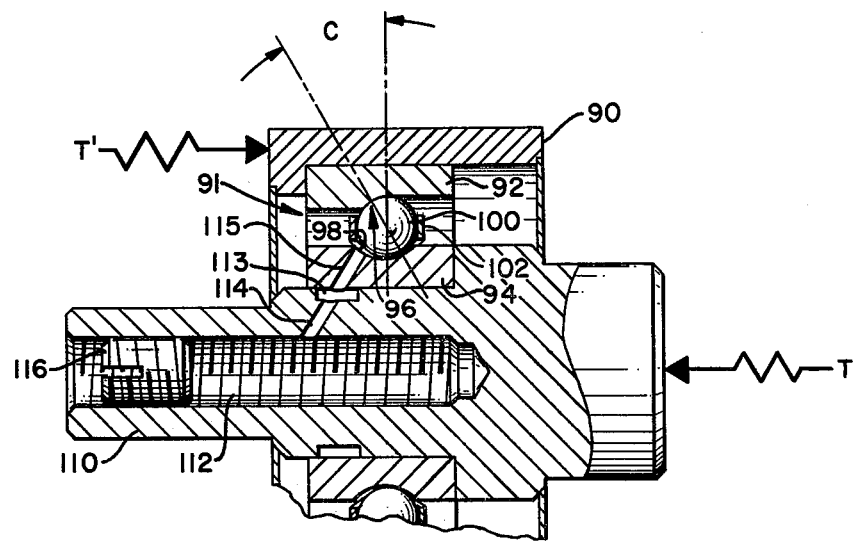
FIG. 5 is a vertical section view of a bearing assembly adapted with an alternative embodiment of the present invention.

FIG. 5 illustrates still another embodiment of the present invention wherein the invention is adapted to a single row bearing that is preloaded in one direction or where a known thrust load exists. In this embodiment, as in the embodiment illustrated in FIGS. 1 through 4, the bearing operates with a contact angle such that the balls contact the inner and outer raceways at an angle to a plane perpendicular to the axis of the bearings. More specifically, the bearing and lubrication assembly illustrated in FIG. 5 includes an outer casing 90 which in turn receives a ball bearing assembly 91 including an outer and inner ring 92 and 94 having an outer and inner raceway 96 and 98, respectively, formed therein. Balls 100 are fitted between outer and inner rings 92 and 94 and track within outer and inner raceways 96 and 98. Separator 102 is fitted within the bearing assembly to maintain the desired spacing of balls 100. Inner ring 94 receives a shaft 110 having an inner bore 112 formed therein. In the embodiment illustrated in FIG. 5, shaft 110 is fitted with a passageway 114 which communicates from bore 112 to an outer annular groove 113 formed around the outer circumference of shaft 110. A complimentary passageway 115 is formed in the inner ring 94 of bearing assembly 91 communicating between raceway 98 and the inner circumference of inner ring 94. Passageway 115 is so positioned as to be alignable with groove 113 of shaft 110 thereby providing a communicating channel from bore 112 to raceway 98. As is illustrated in FIG. 5, passageway 115 communicates to raceway 98 to one side of the curvature of raceway 98 and opposite the point of contact of balls 100 in raceway 98.

As discussed with respect to the embodiments illustrated in FIGS. 1 through 4, the bore 112 is tapped to receive threaded set screw 116. In the embodiment illustrated in FIG. 5, shaft 110 is subjected to thrust load T acting against a restraint on outer casing 90 producing load T'. The bearing assembly is so designed such that this thrust load produces the contact angle C such that balls 100 contact raceway 98 along its surface remote from the opening of passageway 115 therein. Thus, by loading bore 112 with a suitable lubricant L and by advancing set screw 116, lubricant is forced from bore 112 through passageways 114 and 115 and is applied to and distributed by balls 100 as they move in raceway 98. However, the balls 100 do not contact the opening of passageway 115 into raceway 98 thereby avoiding the damage which would otherwise result.

Thus, the present invention provides a system for simply but accurately applying controlled amounts of lubricant to a ball bearing system. The system provides structure for depositing lubricant within the raceway of the ball bearing structure in such a way that the balls do not contact the opening of the passageway delivering the lubricant to the raceway. In this way, damage which would otherwise occur as a result of the movement of the balls over the opening into the raceway, is avoided although lubricant is furnished directly to the ball path.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

What is claimed is:

1. A bearing lubricating system comprising:
   a shaft having an inner raceway formed therearound, a longitudinal bore formed in said shaft and a passageway communicating between the bore and one side of the inner raceway,
   balls for tracking the inner raceway formed around said shaft, said balls having a radius smaller than the radius of the arc of the inner raceway in said shaft,
   an outer ring having an outer raceway formed therein, said outer ring being receivable around said balls to retain said balls between said outer ring and said shaft, and the outer raceway formed in said outer ring and the inner raceway formed in said shaft so that when a thrust load is applied the balls contact the inner and outer raceways at an angle to a plane perpendicular to the axis of the bearing and where the balls contact the inner raceway on the side opposite that side through which the passageway between the bore and the inner raceway is formed such that said balls do not track over the opening of the passageway into the inner raceway, and
   means engageable within the bore of said shaft for selectively forcing lubricant loaded in the bore through the passageway to the inner raceway where the lubricant lubricates the bearing.

2. The bearing lubricating system of claim 1 wherein said force means comprises:
   a threaded set screw fitting for engaging corresponding threads formed in the bore of said shaft whereby said set screw fitting may be advanced or withdrawn from said bore by turning to force lubricant from the bore.

3. A bearing lubricating system comprising:
   a shaft having a concentric bore formed therein, and a passageway communicating between the bore and the outer circumference of said shaft;
   an inner ring adapted to fit on said shaft and having an inner raceway formed therearound, said inner ring having a passageway formed therein communicating between the passageway in said shaft and one side of the inner raceway;
   ball bearings for tracking the inner raceway formed around said inner ring;
   an outer ring having an outer raceway formed therein and receivable about said balls to retain said balls between said inner and outer rings, the outer raceway in said outer ring and the inner raceway in said inner ring being formed such that the balls contact the inner raceway on the side opposite the side through which the passageway through the inner ring is formed such that said balls do not track over the opening of the passageway into the inner raceway; and
   means engageable within the bore of said shaft for selectively forcing lubricant loaded in the bore through the passageway in the shaft and the passageway in the inner ring to the inner raceway where the lubricant lubricates the bearing.

4. The bearing lubricating system of claim 3 wherein said means for selectively forcing lubricant out of the bore formed in said shaft comprises:
   a threaded fitting for engaging corresponding threads formed in the bore of said shaft whereby said fitting may be advanced or withdrawn from said bore to vary the volume of the bore by turning the fitting.

5. A bearing lubricating system comprising:
   a shaft having two inner raceways formed therearound, a concentric bore formed in said shaft and passageways communicating between the bore and the inner raceways,
   balls having a diameter slightly less than the arc diameter of said raceways for tracking the inner raceway formed around said shaft,
   an outer ring having two outer raceways formed therein, the outer raceways in said outer ring having a separation different from the separation between the inner raceways in said shaft such that the balls contact the inner and outer raceways at an angle to a plane perpendicular to the axis of the bearing and where said balls contact the inner raceways on the sides of the inner raceways removed from the points of communication of the passageways between the bore and the inner raceways to prevent the balls from tracking over the opening of the passageways into the inner raceways, and
   means for selectively forcing lubricant loaded in the bore through the passageways to the inner raceways where the lubricant lubricates the bearing.

6. The bearing lubricating system of claim 5 wherein said means for selectively forcing lubricant out of the bore formed in said shaft comprises:
   a threaded fitting for engaging corresponding threads formed in the bore of said shaft whereby said fitting may be advanced into said bore to vary the volume of the bore thereby forcing lubricant out of the bore onto the inner raceway.

7. The bearing lubricating assembly of claim 5 wherein the outer raceways in said outer ring are separated more than the separation between the inner raceways in said shaft such that said balls contact the inner raceways on the outboard sides of the inner raceways and wherein the passageways between the bore and the inner raceways communicate to the inboard side of the inner raceways.

8. A bearing lubricating system comprising:
   a shaft having two inner raceways formed therearound, a concentric bore formed in said shaft and passageways communicating between the bore and the inner raceways, balls having a diameter slightly less than the arc diameter of said raceways for tracking the inner raceway formed around said shaft, an outer ring having two outer raceways formed therein, the outer raceways in said outer ring having a separation different from the separation between the inner raceways in said shaft such that the balls contact the inner and outer raceways at an angle to a plane perpendicular to the axis of the bearing and where said balls contact the inner raceways on the sides of the inner raceways removed from the points of communication of the passageways between the bore and the inner raceways to prevent the balls from tracking over the opening of the passageways into the inner raceways, said passageways in said shaft communicating to the bore at a common point such that lubricant is equally distributed through the passageways; and means engageable within the bore of said shaft for selectively forcing lubricant loaded in the bore through the passageways in the shaft to the inner raceways.

* * * * *